United States Patent [19]
Knopf

[11] Patent Number: 5,507,648
[45] Date of Patent: Apr. 16, 1996

[54] HOLLOW TUBULAR DEVICE TO ASSIST PATIENTS DURING SPEECH THERAPY

[76] Inventor: Jonathan D. Knopf, 8064 East Cloud, Salina, Kans. 67401

[21] Appl. No.: 285,090

[22] Filed: Aug. 3, 1994

[51] Int. Cl.⁶ .............................. G09B 19/04; G10B 3/08
[52] U.S. Cl. .............................. 434/185; 84/334; 84/402
[58] Field of Search .............................. 434/185, 156; 84/334, 402, 410; 472/13

[56] References Cited

U.S. PATENT DOCUMENTS 3,867,770  2/1975  Davis ................................. 434/185
4,579,124  4/1986  Jentges ................................ 128/725
5,169,316  12/1992  Lorman et al. ...................... 434/185

Primary Examiner—Edgar S. Burr
Assistant Examiner—V. Srivastava

[57] ABSTRACT

A hollow tubular device to assist patients during speech therapy a main body portion of a tubular configuration having a hollow interior with an interior surface and having an exterior surface, the main body portion being formed of a plastic material; a pair of parallel end caps at each end of the main body portion, the end caps being circular in shape with a thickness essentially the same thickness as the side wall; and an centrally disposed aperture extending through each end cap.

4 Claims, 2 Drawing Sheets

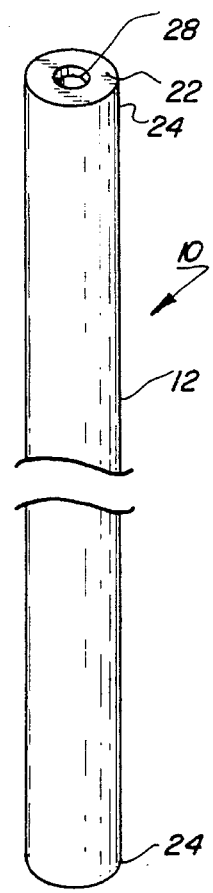
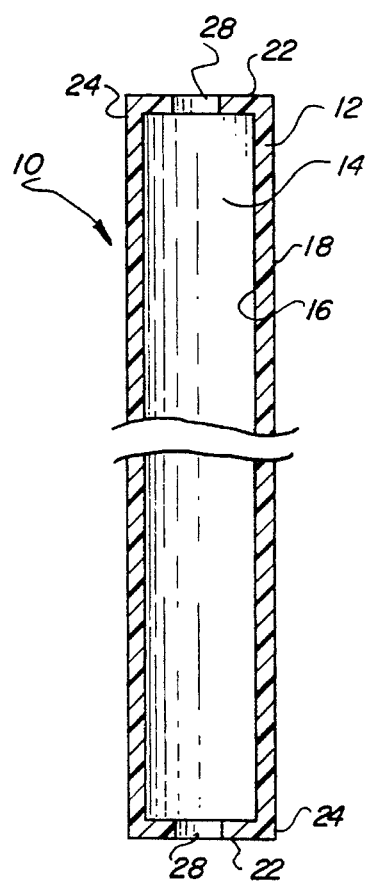
Fig. 3
Fig. 4

HOLLOW TUBULAR DEVICE TO ASSIST PATIENTS DURING SPEECH THERAPY

BACKGROUND OF THE INVENTION

1. Field of the Invention

The present invention relates to a hollow tubular device to assist patients during speech therapy and more particularly pertains to assist patients with speech impediments during therapy through the use of a hollow tubular device positioned adjacent the lower lip during the sounding of "S", "Z", and "TH" sounds

2. Description of the Prior Art

The use of devices of various designs and configurations for use during speech therapy is known in the prior art. More specifically, devices of various designs and configurations for use during speech therapy heretofore devised and utilized for the purpose of assisting patients with speech impediments and impairments of a wide variety of designs and configurations are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 5,123,922 to Berg a speaking tube.

U.S. Pat. No. 4,773,412 to Blom discloses a speaking tracheostomy tube.

U.S. Pat. No. 4,633,864 to Walsh discloses a speaking endotracheal tube.

U.S. Pat. No. 4,460,342 to Mills discloses an aid for speech therapy and a method of making same.

U.S. Pat. No. 3,867,770 to Davis discloses a speech therapy device.

In this respect, the hollow tubular device to assist patients during speech therapy according to the present invention substantially departs from the conventional concepts and designs of the prior art, and in doing so provides an apparatus primarily developed for the purpose of assisting patients with speech impediments during therapy through the use of a hollow tubular device positioned adjacent the lower lip during the sounding of "S", "Z", and "TH" sounds.

Therefore, it can be appreciated that there exists a continuing need for new and improved hollow tubular device to assist patients during speech therapy which can be used for assisting patients with speech impediments during therapy through the use of a hollow tubular device positioned adjacent the lower lip during the sounding of "S", "Z" and "TH" sounds. In this regard, the present invention substantially fulfills this need.

SUMMARY OF THE INVENTION

In view of the foregoing disadvantages inherent in the known types of devices of various designs and configurations for use during speech therapy now present in the prior art, the present invention provides an improved hollow tubular device to assist patients during speech therapy. As such, the general purpose of the present invention, which will be described subsequently in greater detail, is to provide a new and improved hollow tubular device to assist patients during speech therapy and method which has all the advantages of the prior art and none of the disadvantages.

To attain this, the present invention essentially comprises a new and improved hollow tubular device to assist patients during speech therapy comprising, in combination, a main body portion of a tubular configuration having a hollow interior with an interior surface and having an exterior surface, the main body portion being formed of a plastic material with the interior diameter being between about 4 and 8 times the wall thickness; a pair of parallel end caps at each end of the main body portion, the end caps being circular in shape with a thickness essentially the same thickness as the side wall; and an centrally disposed aperture extending through each end cap, the diameter of each aperture being the same and between about 40 and 60 percent of the diameter of the end caps whereby when placed on the lower lip of a person with a speech impediment and the second end located therebeneath, a person pronouncing the "S", "Z" and "TH" sounds will be able to feel and sense the proper enunciation of such sounds to assist in their therapy.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved hollow tubular device to assist patients during speech therapy which have all the advantages of the prior art devices of various designs and configurations for use during speech therapy and none of the disadvantages.

It is another object of the present invention to provide a new and improved hollow tubular device to assist patients during speech therapy which may be easily and efficiently manufactured and marketed.

It is further object of the present invention to provide a new and improved hollow tubular device to assist patients during speech therapy which are of durable and reliable constructions.

An even further object of the present invention is to provide a new and improved hollow tubular device to assist patients during speech therapy which are susceptible of a low cost of manufacture with regard to both materials and labor, and which accordingly are then susceptible of low prices of sale to the consuming public, thereby making such hollow tubular device to assist patients during speech therapy economically available to the buying public.

Still yet another object of the present invention is to provide a new and improved hollow tubular device to assist patients during speech therapy which provide in the apparatuses and methods of the prior art some of the advantages thereof, while simultaneously overcoming some of the disadvantages normally associated therewith.

Still another object of the present invention is to assist patients with speech impediments during therapy through the use of a hollow tubular device positioned adjacent the lower lip during the sounding of "S", "Z" and "TH" sounds.

Lastly, it is an object of the present invention to provide new and improved hollow tubular device to assist patients during speech therapy a main body portion of a tubular configuration having a hollow interior with an interior surface and having an exterior surface, the main body portion being formed of a plastic material; a pair of parallel end caps at each end of the main body portion, the end caps being circular in shape with a thickness essentially the same thickness as the side wall; and an centrally disposed aperture extending through each end cap.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a perspective illustration of the device shown in the prior Figures.

FIG. 4 is a cross sectional view of the device taken centrally along the axis thereof.

The same reference numerals refer to the same parts through the various Figures.

DESCRIPTION OF THE PREFERRED EMBODIMENT

Figure 1:
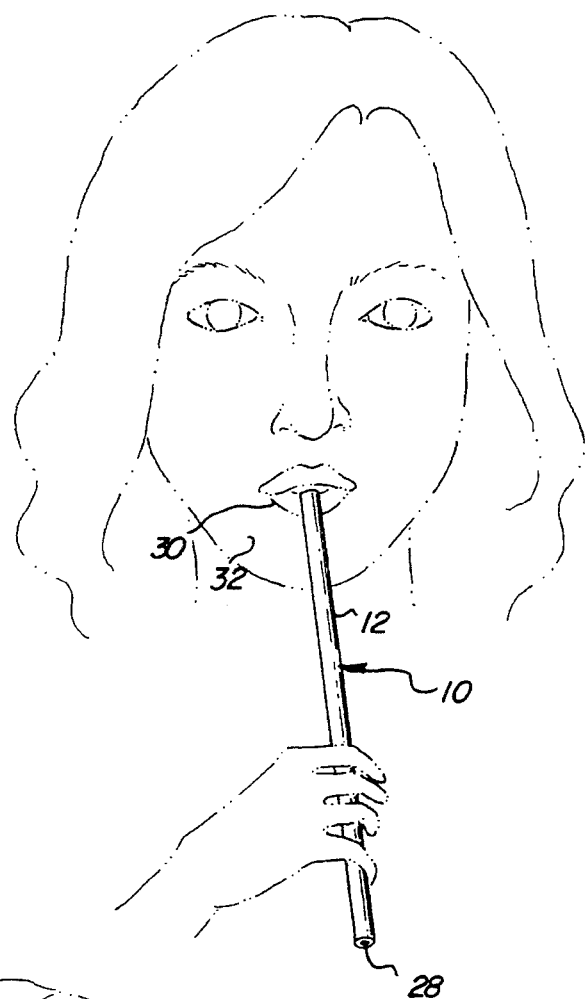
FIG. 1 is a perspective view of the preferred embodiment of the hollow tubular device to assist patients during speech therapy constructed in accordance with the principles of the present invention.
Figure 2:
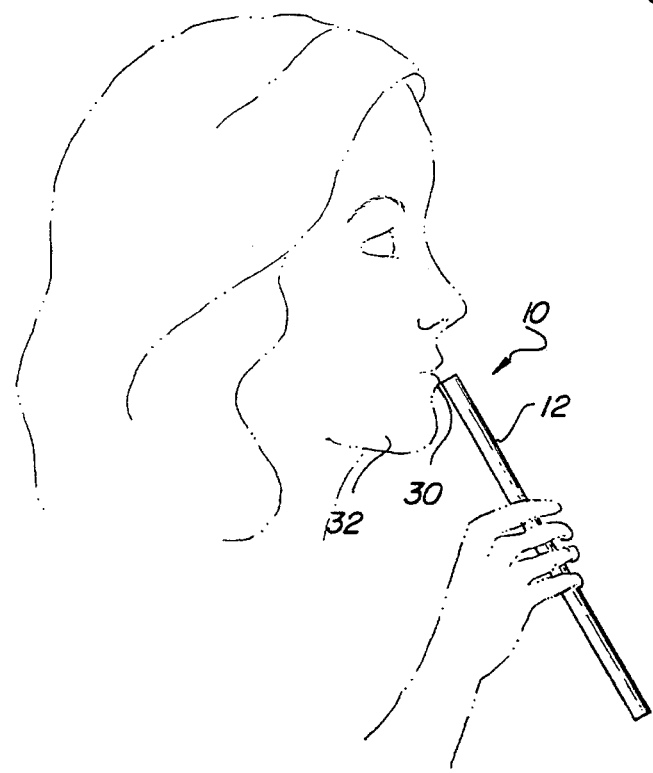
FIG. 2 is a side elevational view of the device shown in FIG. 1.

With reference now to the drawings, and in particular to FIG. 1 thereof, the preferred embodiment of the new and improved hollow tubular device to assist patients during speech therapy embodying the principles and concepts of the present invention and generally designated by the reference numeral 10 will be described.

The present invention, the new and improved hollow tubular device to assist patients during speech therapy is comprised of a plurality of component elements. Such component elements in their broadest context, include a main body portion, parallel end caps and apertures within the end caps. Such components are individually configured and correlated with respect to each other so as to attain the desired objectives.

The central component of the system 10 is the main body portion 12. The main body portion is of a tubular configuration. It has a hollow interior 14. It also has an interior surface 16 and an exterior surface 18. The main body portion is formed of a plastic, generally rigid, material. The interior diameter is between about 4 and 8 times the wall thickness.

Next provided is a pair of parallel end caps 22. Each end 24 of the main body portion is provided with an end cap. The end caps are of a circular configuration in shape. They have a thickness which is essentially the same thickness as the side wall.

The last component of the system is a centrally disposed aperture 28. Such an aperture extends through each end cap. The diameter each aperture is the same as each other. The diameter is between about 40 and 60 percent of the diameter of the end cap. In this manner, when the device is placed in the lower lip 30 of a person 32 with a speech impediment and the second end located beneath such lip, then a person pronouncing the sounds of the letter "S", "Z" and "TH" will be able to feel and sense the proper enunciation of such words. This assists in the therapy of the person using the device.

Many people require speech therapy for a variety of reasons. Sometimes it is because of an accident, a problem with the structure of the teeth or mouth, psychological problems, or a number of other reasons. Schools and hospitals employ professional speech therapists to work with these people and many times they are able to reduce or eliminate the problem. Often they require props to help make the person understand how the sound is supposed to be produced and feel it coming from the lips.

The present invention is a tool to help speech therapists teach people how to properly pronounce the "S", "Z", and "TH" sounds. This tool resembles a plastic pencil which has a hole through the center. The patient places one end of the present invention against their bottom lip, while attempting to say each of the sounds. Air is pushed through the hole at the top and escapes through the bottom. As each word is pronounced, the person can feel and hear the sound escaping from their lips. In this way, a sense of the proper enunciation is developed.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved hollow tubular device to assist patients during speech therapy comprising, in combination:

a main body portion of a tubular configuration having a hollow interior with an interior surface and having an exterior surface, the main body portion being formed of a plastic material with the interior diameter being between about 4 and 8 times the wall thickness;

a pair of parallel end caps, one at each end of the main body portion, the end caps being circular in shape with a thickness essentially the same thickness as the side wall; and a centrally disposed aperture extending through each end cap, the diameter of each aperture being the same and between about 40 and 60 percent of the diameter of the end caps whereby when placed on the lower lip of a person with a speech impediment and the second end located therebeneath, a person pronouncing the "S", "Z" and "TH" sounds will be able to feel and sense the proper enunciation of such sounds to assist in their therapy.

2. A hollow tubular device to assist patients during speech therapy:

a main body portion of a tubular configuration having a hollow interior with an interior surface and having an exterior surface, the main body portion being formed of a plastic material;

a pair of parallel end caps, one at each end of the main body portion, the end caps being circular in shape with a thickness essentially the same thickness as the side wall; and a centrally disposed aperture extending through each end cap.

3. The device as set forth in claim 2 wherein the interior diameter being between about 4 and 8 times the wall thickness.

4. The device as set forth in claim 2 wherein the diameter of each aperture being the same and between about 40 and 60 percent of the diameter of the end cap.

* * * * *